United States Patent
Bram

[15] 3,653,691
[45] Apr. 4, 1972

[54] CONNECTING DEVICE FOR PIPES AND APPLICATIONS THEREOF

[72] Inventor: Georges Eugene Bram, Pont-A-Mousson, France

[73] Assignee: Centre de Recherches de Pont-A-Mousson, Pont-A-Mousson, France

[22] Filed: Dec. 8, 1969

[21] Appl. No.: 883,188

[30] Foreign Application Priority Data

Dec. 17, 1968 France..................................178593

[52] U.S. Cl..............................285/236, 285/318, 285/343, 285/353
[51] Int. Cl.........................................F16l 19/00
[58] Field of Search..................285/236, 318, 244, 112, 353, 285/352, 340, 343, 383, 235, 416, 342, 356

[56] References Cited

UNITED STATES PATENTS

| | | | |
|---|---|---|---|
| 822,530 | 6/1906 | Lowe | 285/353 X |
| 927,635 | 7/1909 | Calvert | 285/416 X |
| 2,561,887 | 7/1951 | Risley | 285/348 X |
| 2,698,191 | 12/1954 | Samiran | 285/341 X |
| 3,401,959 | 9/1968 | Reiss et al. | 285/343 |
| 3,441,297 | 4/1969 | Koski | 285/348 X |
| 3,468,566 | 9/1969 | Nietzel | 285/353 X |
| 2,385,156 | 9/1945 | Newell | 285/356 X |

FOREIGN PATENTS OR APPLICATIONS

| | | | |
|---|---|---|---|
| 536,215 | 2/1922 | France | 285/353 |
| 815,528 | 4/1937 | France | 285/353 |
| 498,686 | 1/1939 | Great Britain | 285/352 |
| 33,879 | 5/1905 | Switzerland | 285/342 |

Primary Examiner—Thomas F. Callaghan
Attorney—J. Delattre-Seguy

[57] ABSTRACT

Connecting device for interconnecting two tubular elements of piping at least one of which has a tubular smooth end portion. The device comprises a flexible and resiliently yieldable sealing sleeve which overlaps the smooth end portion. A withdrawable ring of hard material is interposed between the sleeve and outer axially movable means having an inner tapered clamping face. The outer means radially clamps the sealing sleeve on the smooth end portion through the withdrawable ring which binds the sleeve and has an end embedded in the smooth end portion.

15 Claims, 6 Drawing Figures

INVENTOR:
Georges Eugène BRAM
by: J. Delattre-Seguy
Attorney

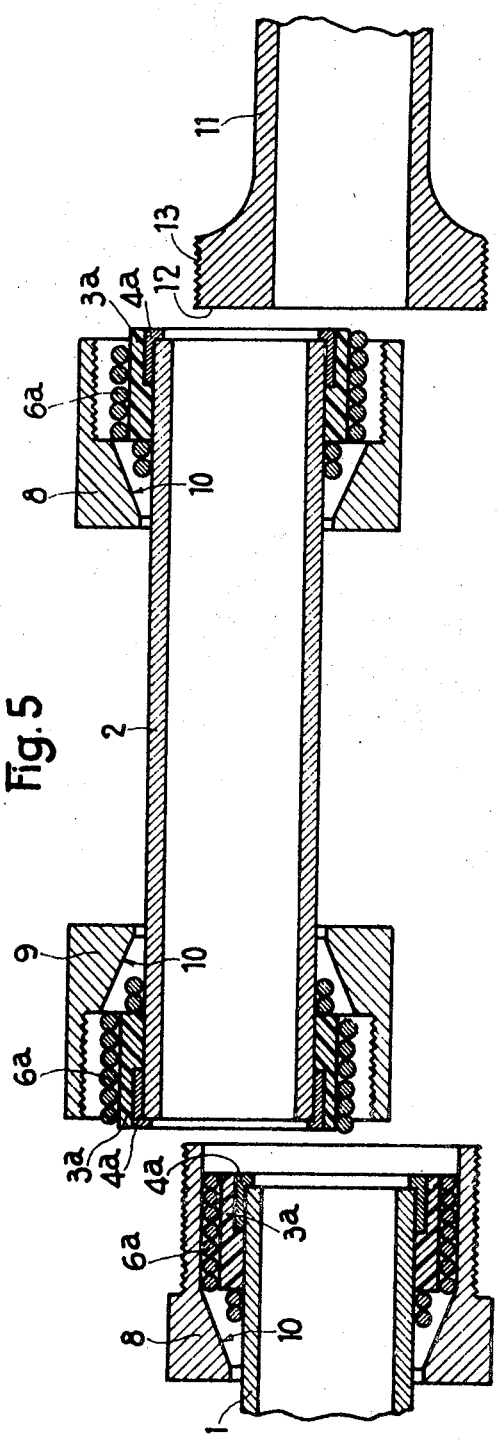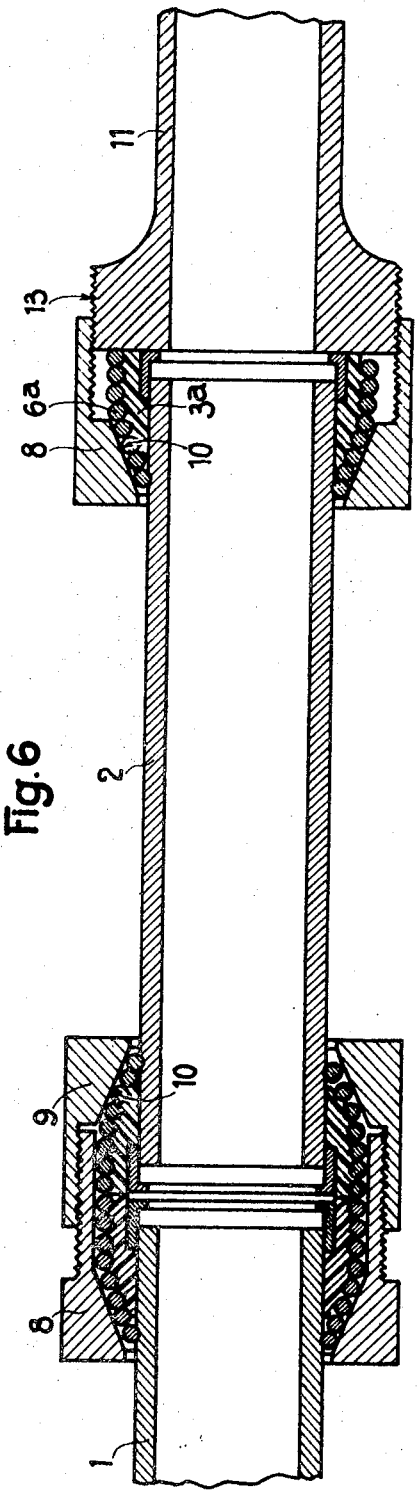

3,653,691

CONNECTING DEVICE FOR PIPES AND APPLICATIONS THEREOF

The present invention relates to the connection of pipes.

Connecting devices are known for pipes of the same diameter, the assembly of which is effected with the approximative preparation of the ends of the pipes. These devices are particularly appreciated on the construction or building sites.

In known devices, a ring is set in or secured on the ends of the pipes and performs the two functions, namely the sealing and the locking in position of the connection. Some devices require an excellent surface condition of the piping and the connections to achieve the preferred seal. Further, when dis-assembling, the ring remains secured to the ends of the pipes and difficulty is experienced when fully dis-assembling without deteriorating the ring or the pipes.

The object of the invention is to provide a connecting device for two pipe elements for fluid under pressure, at least one of said elements having a smoothed tubular end portion, the device being so improved that the functions of sealing and locking are fulfilled by two different members, so that it is possible to select the material appropriate for each of these functions.

The invention provides a connecting device for two elements of piping of the type comprising a sealing sleeve which overlaps at least the smooth end portion and is radially clamped on the latter by the axial displacement of an outer movable means provided with an inner tapered clamping face, a withdrawable ring of hard material being interposed between the sealing sleeve, which is flexible and elastically yieldable, and the axially movable means, the ring binding the sleeve and being embedded at one of its ends in the smooth tubular end portion.

This device permits the interconnection of the pipe elements with a good sealing effect against pressure and a ready disassembly of the elements.

Another object of the invention is to provide piping having two successive tubular elements which are interconnected by the connecting device described hereinbefore.

Further features and advantages of the invention will be apparent from the ensuing description with reference to the accompanying drawings.

In the drawings :

FIG. 5 is an axial sectional view of a modification of the connecting device before assembly, and FIG. 6 is a view similar to FIG. 5 after assembly.

Figure 1:
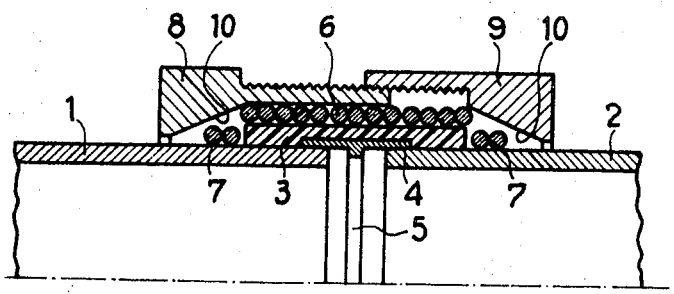
FIG. 1 is a half-sectional view of a connecting device according to the invention in the course of assembly on the pipes for the purpose of connecting the latter.
Figure 2:
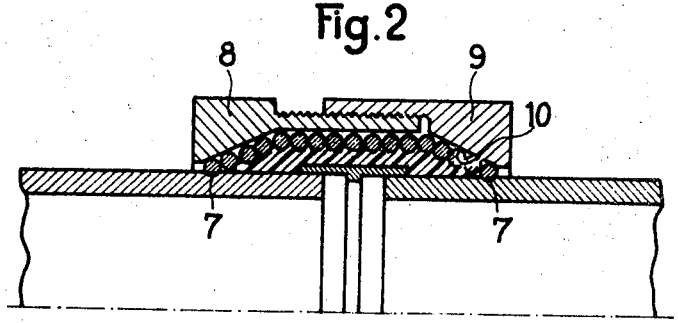
FIG. 2 is a half-sectional view of the connecting device completely assembled and fully interconnecting the two pipes.
Figure 3:
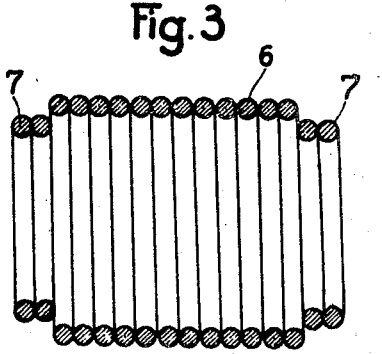
FIG. 3 is an axial sectional view of the withdrawable ring employed in the connecting device.

According to the embodiment shown in FIGS. 1–3, the invention is applied to the connection of two pipes or tubular elements 1 and 2 of piping. These pipes, elbows or other elements, are merely cut to length within a few millimeters. A sleeve 3 of elastically yieldable material, for example of an elastomer suitable for the conveyance of the fluid flowing in the pipes 1 and 2, has internally a maintaining ring 4 of rigid material embedded in the sleeve. This ring has a centre abutment rib 5 which facilitates the positioning of the two pipes. The inside diameter of the sleeve 3 is roughly equal to the outside diameter of the pipes.

A withdrawable ring 6 surrounds the sleeve 3 and extends beyond the latter over the pipes 1 and 2. In the illustrated embodiment, the ring 6 comprises a wire of hard metal wound helically with circular adjoining turns or coils. As can be seen in FIG. 3, the ring 6 has, in the free state and at each end, coils 7 of smaller diameter than those of the body of the ring adapted to surround the sleeve 3. The diameter of the coils 7 is roughly equal to the diameter of the pipes 1 and 2.

Two outer clamping or tightening members 8 and 9, constituting a screw and nut assembly, are provided. Each member comprises an inner tapered face 10. In this case, the screwthreads of the tightening members 8 and 9 are advantageously in such direction that the direction of rotation corresponding to their screwing together is in the opposite direction to that of the winding of the coils of the ring 6.

The connecting device is assembled in the following manner:

The members 8 and 9 are engaged on the respective end portions of the pipes 1 and 2 to interconnect, their screwthreads being adjacent the end of the corresponding pipe. The previously assembled assembly, comprising the sealing sleeve 3, the maintaining collar 4 and the withdrawable ring 6, is urged onto the end of one of the pipes, for example the pipe 1. Pipe 2 is then introduced into the other end of the withdrawable ring 6.

The axial movement of the pipes 1 and 2 is limited by the abutment rib 5 of the collar 4. The members 8 and 9 are then screwed together (FIG. 1). In the course of their axial movement towards each other, their inner tapered faces 10 deform the ring 6 and consequently the elastically yieldable sleeve 3, and then deform the last coil or coils 7 of the ends of the ring 6 which are impressed into the pipes 1 and 2 at the end of the movement of the tightening members 8 and 9. These members are screwed together tight. In the finished assembly, the positions of the component parts are as shown in FIG. 2.

As the ring 6 is of hard material, the connecting device is locked onto the pipes 1 and 2.

The screwing together of the members 8 and 9 causes the material of the sleeve 3 to flow after which the sleeve 3 is bound onto the pipes 1 and 2.

As the direction of winding of the coils of the sleeve 6 is in the opposite direction of the direction of the screwthreads on the members 7 and 8 the removal of the ring 6 is facilitated.

For dis-assembly, the members 8 and 9 are unscrewed from each other, the tapered faces 10 axially move away from each other, the ring 6, owing to its resilience and shape, and the elastically yieldable sleeve 3 resume their initial shapes shown in FIG. 1. The component parts of the connecting device can be easily dis-assembled without harming the pipes 1 and 2 or these component parts. Therefore, it is possible to assemble and dis-assemble this connecting device several times without inconvenience.

The combination of an elastically yieldable sealing sleeve 3 with the withdrawable locking ring 6 is therefore advantageous in that the connecting device may be dis-assembled with no harm to its sealing properties for any subsequent utilization.

Figure 4:
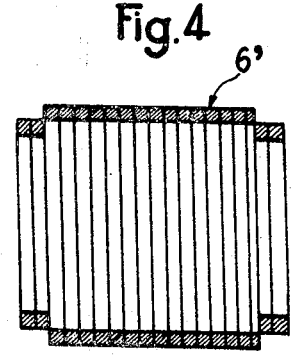
FIG. 4 is an axial sectional view of a modification of the withdrawable ring.

FIG. 4 shows a modification 6' of the withdrawable ring. The ring 6' comprises adjoining coils having a square cross section. This embodiment may be of interest in the combination of the appropriate materials for the sleeves and the pipes 1 and 2. Indeed, in respect of the pipes of relatively soft material, coils having a round cross section would mark the surface thereof excessively.

FIGS. 5 and 6 show a modification of the connecting device according to the invention applied to an "in line" assembly in which a tube 2 connects a screwthreaded end pipe 11 to another smooth tube 1.

In this embodiment, assembly and dis-assembly is possible without separating the tubes or the connecting elements.

To facilitate assembly, there are employed half-sleeves 3a for sealing, with half-collars 4a associated with withdrawable half-rings 6a.

In the right part of FIGS. 5 and 6, the connecting device is employed for connecting the tube 2 to the screwthreaded end pipe 11 which has a plane face 12 against which the half-sleeve 3a is axially highly compressed as the member 8 is screwed along the screwthreads 13 of the end pipe 11. This results in a deformation of the half-ring 6a by the inner tapered face 10 of the member 8. The left connection between the tube or pipe 1 and the tube 2 is identical to that of the first embodiment except that the half-sleeve 3a and the half-rings 6 are disposed in end-to-end relation.

The connecting device of this embodiment is assembled and dis-assembled under the same conditions as those of the embodiment shown in FIGS. 1 and 2.

Although specific embodiments of the invention have been described, many modifications and changes may be made therein without departing from the scope of the invention.

In respect of pipe connections which need not resist high internal pressure (less than 1 bar), the collar 4 can be dispensed with. On the other hand, in respect of high-pressure pipe connections, the clamping force of the members 8 and 9 is important. Owing to this force, a deformation of the free end of the elastically yieldable sleeve 3 in the part thereof located between the two parts to be interconnected, could impair the correct locking of the connecting device on the pipes.

There could also be provided for deforming the ring 6 and binding the sleeve 3, not rings fixed one inside the other but flanges clamped against each other by any suitable means.

Having now described my invention what I claim as new and desire to secure by Letters Patent is:

1. A connecting device for interconnecting a cylindrical first pipe element and a cylindrical second pipe element on a common axis, said first element having a cylindrical smooth end portion, said device comprising a flexible and resiliently yieldable sealing sleeve for encompassing a first part of said smooth end portion, a first member having an inner annular tapered face coaxial with said sleeve, means defining a second member for association with said second element and adapted to be screwthreadedly coaxially engaged with said first member for relative axial screwed adjustment of said members between axially outer relative positions and axially inner relative positions, a helical coil spring of hard material having a generally cylindrical body portion which is radially interposed between said sleeve and said first member and has a plurality of coils and extends throughout the length of said sleeve and is in movable and radially abutting relation to said sleeve in said outer relative positions of said members, said spring having a first end portion and an opposed second end portion which extends axially beyond said sleeve and comprises a coil of said spring for encompassing and directly engaging a second part of said smooth end portion and is located adjacent said tapered face, means defining a support associated with said second member and capable of axially engaging said first end portion of said spring when said members are screwed toward said inner relative positions, said tapered face tapering between a first diameter substantially equal to the outside diameter of said body portion of said spring and a second diameter less than the outside diameter of said second end portion of said spring, whereby when said members are screwed to said inner relative positions an end portion of said sleeve adjacent said second end portion of said spring is crushed by said spring and compressed against said first element and said second end portion of said spring is embedded in said first element.

2. A device as claimed in claim 1, wherein said helical spring has adjoining coils, and said end portion has an inside diameter which is less than the inside diameter of said body portion of said spring for contacting said smooth end portion when inserting said first element in said device.

3. A connecting device as claimed in claim 2, wherein said coils have a round cross-sectional shape.

4. A connecting device as claimed in claim 2, wherein said coils have a substantially square cross-sectional shape defining two sides parallel to the axis of the spring.

5. A device as claimed in claim 1, comprising a rigid inner reinforcing collar located inside and combined with said sealing sleeve for surrounding an end part of said tubular smooth end portion.

6. A device as claimed in claim 1, wherein said sealing sleeve has a cylindrical outer face and an annular end face which is adjacent said tapered face and extends throughout the radial extent of said sleeve and is substantially contained in a plane perpendicular to the axis of said sleeve.

7. A device as claimed in claim 1, wherein said second member is a tightening flange on said second pipe element.

8. A connecting device for interconnecting a first pipe element having a cylindrical smooth end portion and a second pipe element having a cylindrical smooth end portion on a common axis, said device comprising a flexible and resiliently yieldable sealing sleeve for encompassing a first part of each smooth end portion, a first member and a second member adapted to be screwthreadedly coaxially interengaged for relative axial screwed adjustment of said members between axially outer relative positions and axially inner relative positions, each member having an inner annular tapered face coaxial with said sleeve, said tapered faces being located adjacent opposite ends of said sleeve, a helical coil spring of hard material having a generally cylindrical body portion which is radially interposed between said sleeve and said members and has a plurality of coils and extends throughout the length of said sleeve and is in movable and radially abutting relation to said sleeve in said outer relative positions of said members, said spring having end portions which extend axially beyond said sleeve for respectively encompassing and directly engaging second parts of said smooth end portions and located adjacent said tapered faces, each end portion of said spring comprising a coil of said spring, said tapered faces tapering between a first diameter substantially equal to the outside diameter of said body portion of said spring and a second diameter less than the outside diameter of said end portions of said spring, whereby when said members are screwed to said inner relative positions said tapered faces cause said spring to crush end portions of said sleeve and compress them against said elements and cause said end portions of said spring to be embedded in said elements.

9. A device as claimed in claim 8, wherein said spring is in two axial halves and said sleeve is in two axial halves, the two spring and sleeve halves respectively coacting with said two members.

10. A piping structure comprising a first tubular pipe element and a second tubular pipe element coaxial with said first element, said first element having a tubular smooth end portion, and a connecting device interconnecting said elements and comprising a flexible and resiliently yieldable sealing sleeve coaxial with said first element and overlapping and engaging said smooth end portion, a first member having an inner annular tapered face coaxial with said sleeve, means defining a second member associated with said second element and screwthreadedly coaxially engaged with said first member, said members being capable of being axially adjusted by screwing between inner relative positions and outer relative positions, a helical coil spring having a body portion which is radially interposed between said first member and said sleeve and has a plurality of coils and extends throughout the axial extent of said sleeve and in radially abutting relation to said sleeve, said spring having a first end portion and an opposed second end portion which extends axially beyond said sleeve and comprises a coil of said spring and is partially embedded in said smooth end portion, means defining a support associated with said second member and supportingly engaging said first end portion of said spring, said tapered face maintaining said spring second end portion embedded in said smooth end portion and maintaining a localized part of said spring body portion adjoining said spring second end portion and a corresponding adjoining end portion of said sleeve in radially highly compressed and radially highly deformed conditions considerably more pronounced than in remaining parts of said sleeve and spring, said conditions being those resulting from the fact that the end parts of said sleeve and said spring body portion adjacent said tapered face are substantially cylindrical in uncompressed undeformed conditions which exist when said members are in said outer relative positions in which said tapered face does not exert a deforming force on said spring and sleeve.

11. A piping structure as claimed in claim 10, wherein said second tubular element also has a tubular smooth end portion overlapped and engaged by said sleeve and said first end portion of said spring is similar to said second end portion and is partially embedded in said smooth end portion of said second tubular element, said second member also having a tapered inner face engaging and compressing the corresponding spring and sleeve in the same way as said tapered face of said first member.

12. A piping structure as claimed in claim 10, wherein said second tubular element also has a tubular smooth end portion and a sealing sleeve and a spring identical to the aforementioned sleeve and spring associated with said second tubular element smooth end portion, the two sealing sleeves and springs being in end-to-end abutment and said second member having a tapered inner annular face engaging and compressing the corresponding sleeve and spring in the same way as said tapered face of said first member.

13. A piping structure as claimed in claim 10, wherein said second tubular element has a screwthreaded end portion integral with the second element and constituting said second member, said screwthreaded end portion having an end face constituting said support.

14. A piping structure as claimed in claim 13, comprising an inner annular recess in said sleeve and a rigid collar in said recess, said collar having an inside diameter corresponding to the outside diameter of said smooth end portion and an annular inner rib capable of acting as an abutment for the end of said first element.

15. A connecting device for interconnecting a cylindrical first pipe element and a cylindrical second pipe element on a common axis, said first element having a cylindrical smooth end portion, said device comprising a flexible and resiliently yieldable sealing sleeve for encompassing a first part of said smooth end portion, a first member having an inner annular tapered face coaxial with said sleeve, means defining a second member for association with said second element and adapted to be screwthreadedly coaxially engaged with said first member for relative axial screwed adjustment of said members between axially outer relative positions and axially inner relative positions, a helical coil spring of hard material having a body portion which is radially interposed between said sleeve and said first member and has a plurality of coils and extends substantially throughout the length of said sleeve and is in movable and radially abutting relation to said sleeve in said outer relative positions of said members, said spring having an end portion which extends axially beyond said sleeve and comprises a coil of said spring for encompassing and directly engaging a second part of said smooth end portion and is located adjacent said tapered face, said tapered face tapering between a first diameter substantially equal to the outside diameter of said body portion of said spring and a second diameter less than the outside diameter of said end portion of said spring, and a rigid inner collar inside said sleeve in a part of the sleeve remote from a part of the sleeve which is surrounded by said tapered face in said inner relative positions of said members.

* * * * *